(12) United States Patent
Marin et al.

(10) Patent No.: US 8,458,570 B2
(45) Date of Patent: Jun. 4, 2013

(54) RECOVERY OF TRANSMISSION ERRORS

(75) Inventors: Cedric Marin, Bordeaux (FR); Michel Kieffer, Bourg-la-Reine (FR); Pierre Duhamel, Le Plessis Robinson (FR)

(73) Assignee: Alcatel Lucent, Paris (FR)

( * ) Notice: Subject to any disclaimer, the term of this patent is extended or adjusted under 35 U.S.C. 154(b) by 170 days.

(21) Appl. No.: 12/736,670

(22) PCT Filed: May 6, 2009

(86) PCT No.: PCT/EP2009/055476
§ 371 (c)(1),
(2), (4) Date: Dec. 7, 2010

(87) PCT Pub. No.: WO2009/135873
PCT Pub. Date: Nov. 12, 2009

(65) Prior Publication Data
US 2011/0087952 A1  Apr. 14, 2011

(30) Foreign Application Priority Data
May 6, 2008  (EP) .................................... 08305153

(51) Int. Cl.
*H03M 13/00* (2006.01)
(52) U.S. Cl.
USPC ........................... 714/776; 714/756; 714/781
(58) Field of Classification Search
USPC ................ 714/776, 756, 792, 781, 784, 755, 714/809
See application file for complete search history.

(56) References Cited

U.S. PATENT DOCUMENTS

| 6,981,200 | B2 * | 12/2005 | Maung et al. ................. 714/781 |
| 2004/0005012 | A1 | 1/2004 | Suzuki et al. |
| 2004/0039769 | A1 | 2/2004 | Orio |
| 2004/0081075 | A1 * | 4/2004 | Tsukakoshi ................... 370/206 |
| 2005/0207350 | A1 | 9/2005 | Bloebaum |

FOREIGN PATENT DOCUMENTS

| EP | 1 391 995 | 2/2004 |
| WO | WO 02/51087 | 6/2002 |
| WO | WO 2005/096553 | 10/2005 |

* cited by examiner

*Primary Examiner* — Fritz Alphonse
(74) *Attorney, Agent, or Firm* — Harness, Dickey & Pierce, P.L.C.

(57) ABSTRACT

A method for recovering transmission errors, comprising: receiving a data packet comprising an error detection code associated to data contained in the packet, wherein the data associated to the error detection code comprises primary data and secondary data, checking the error detection code of the received packet to detect an erroneous state of the associated data, when the erroneous state is detected, determining a finite set of candidate values for the primary data and, for each values of the set: determining a marginal likelihood of the candidate value as a function of the error detection code of the received packet, determining a first correlation between the primary data of the received packet and the candidate value, and selecting a corrected value for the primary data among the set of candidate values as a function of said marginal likelihoods and said first correlations.

15 Claims, 8 Drawing Sheets

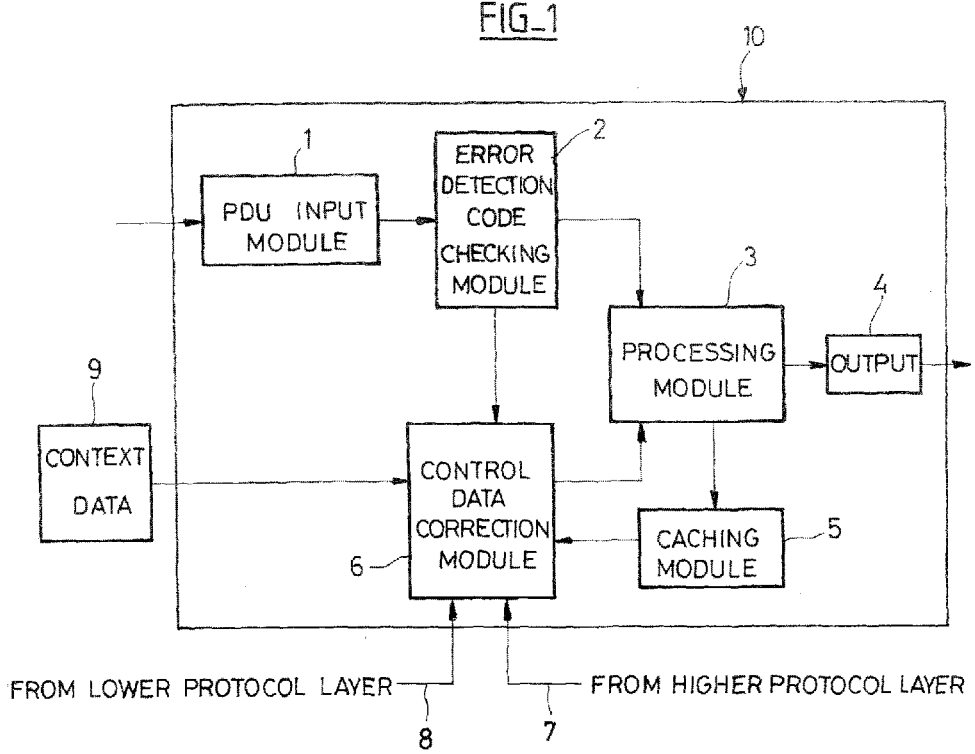
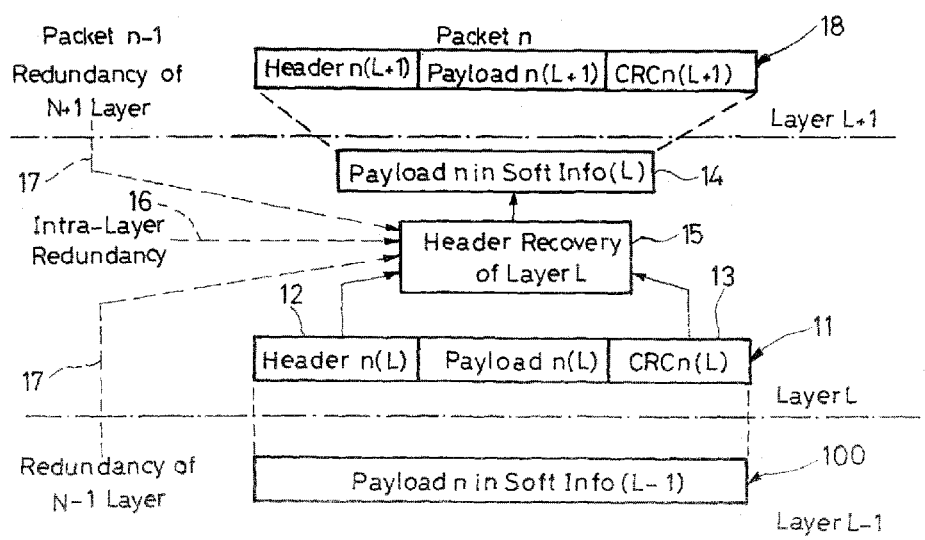

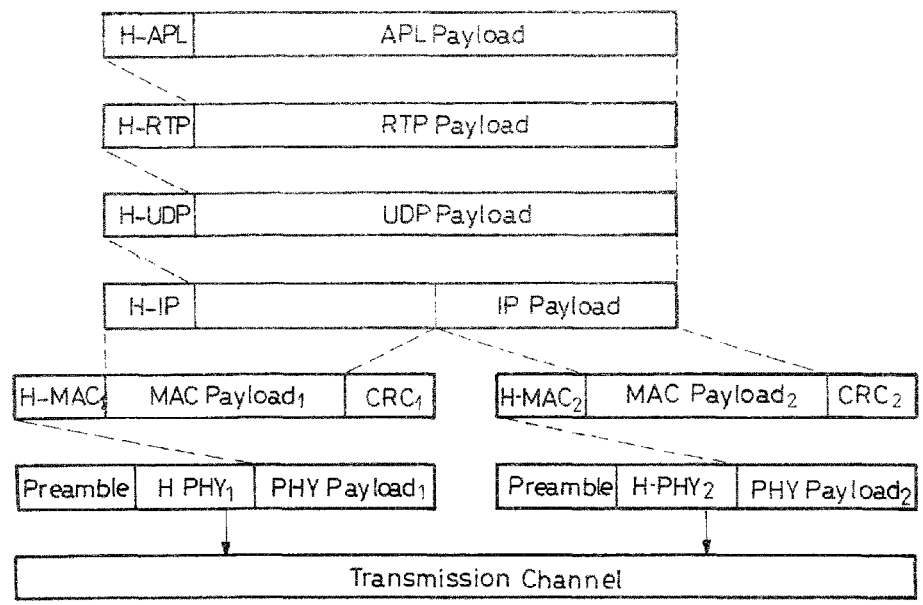
FIG_3
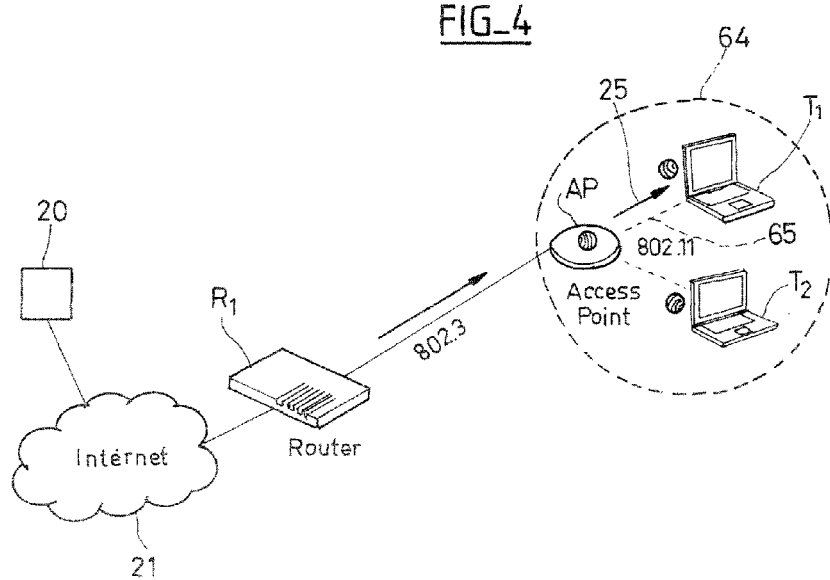
FIG_4

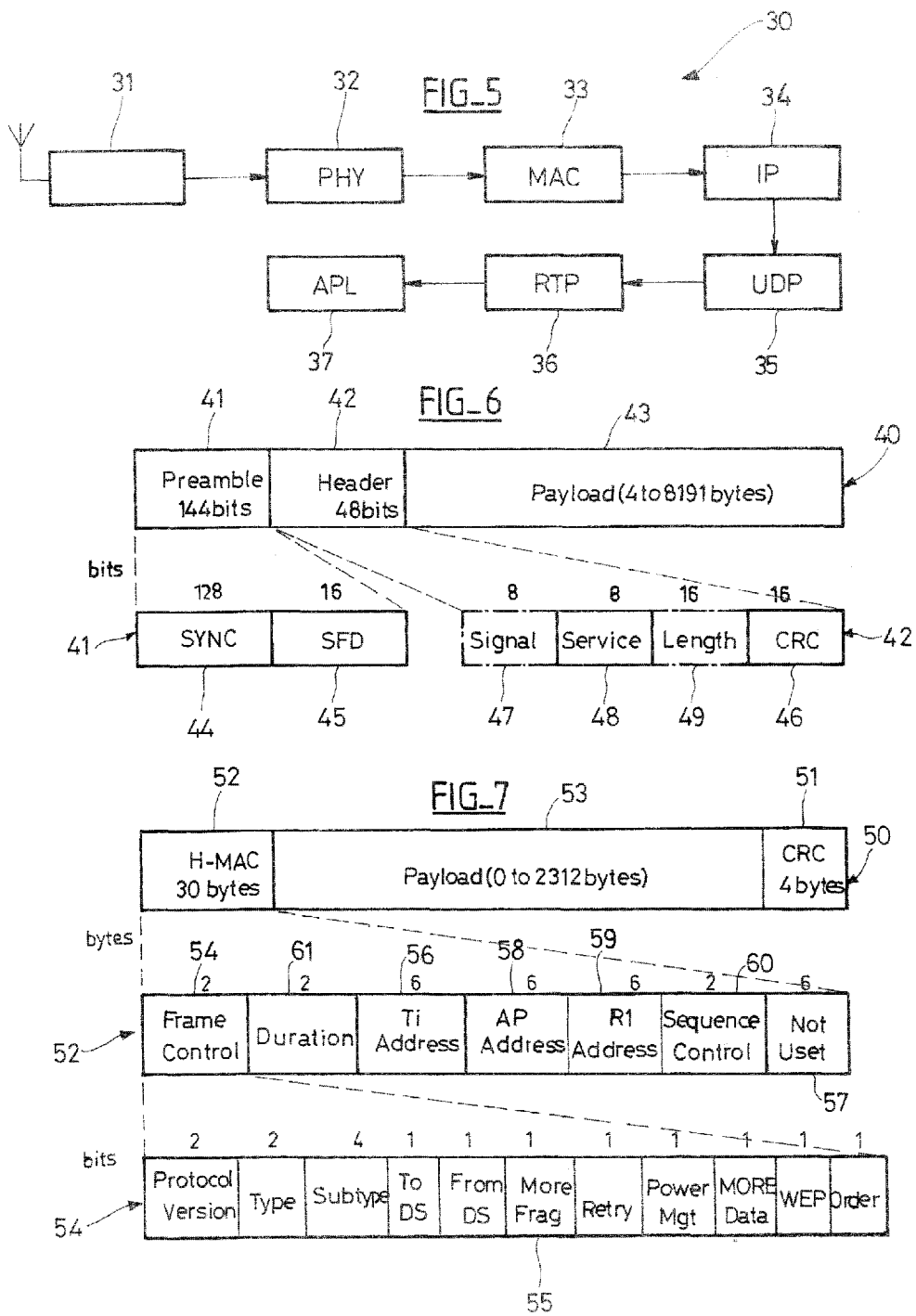

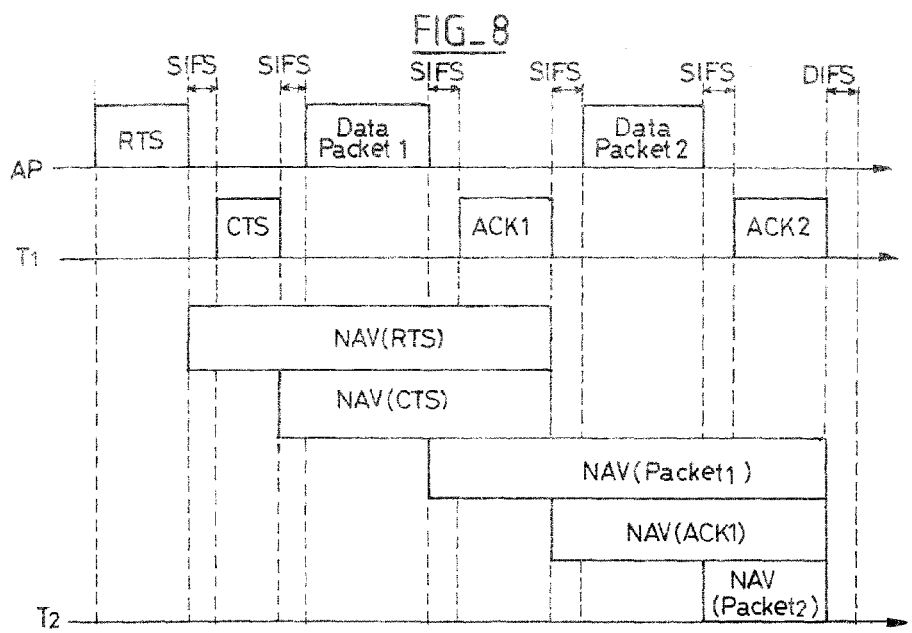
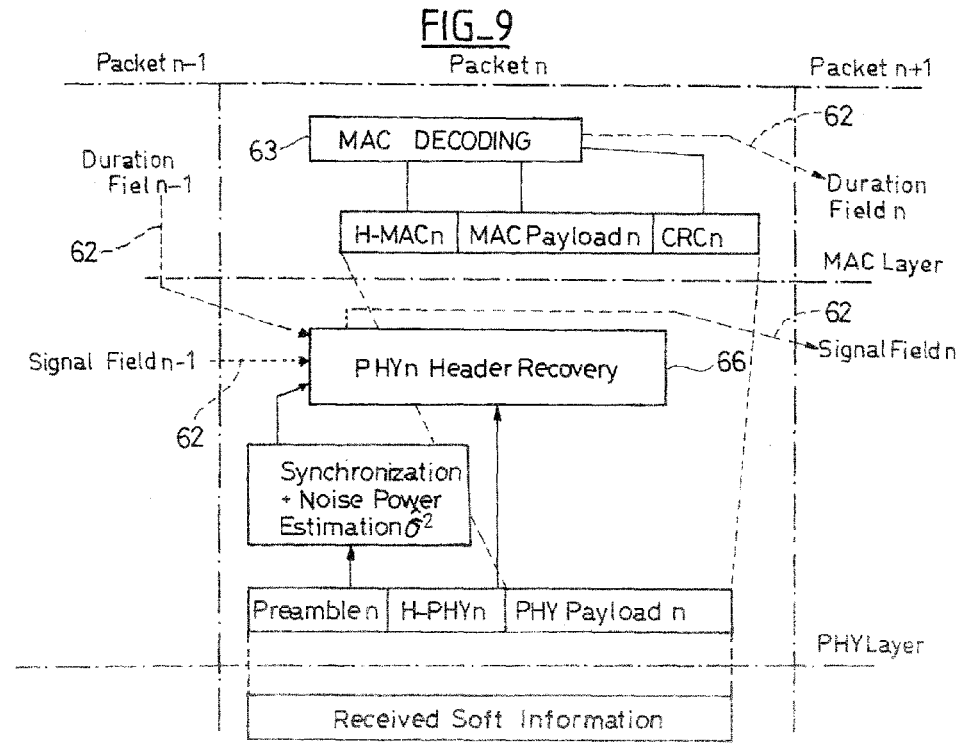

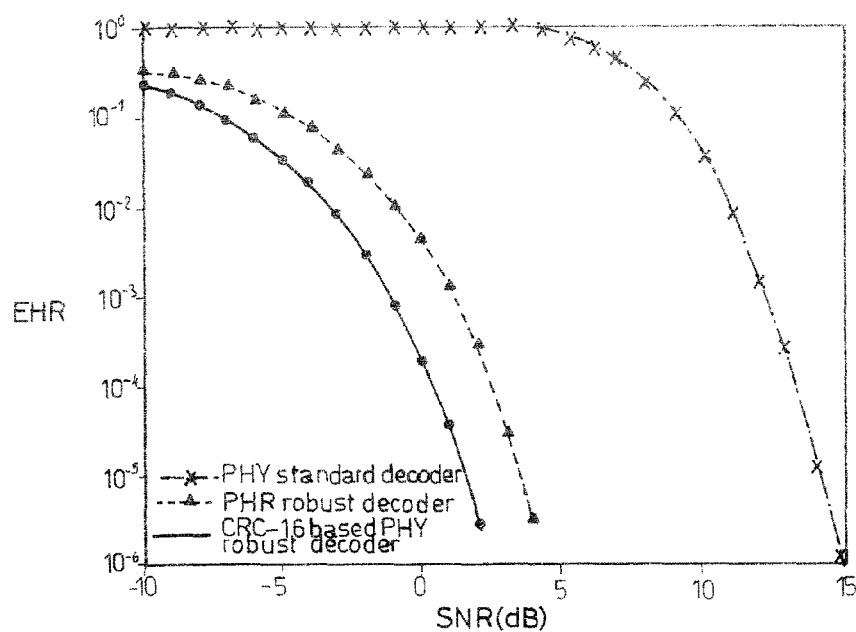
FIG_10
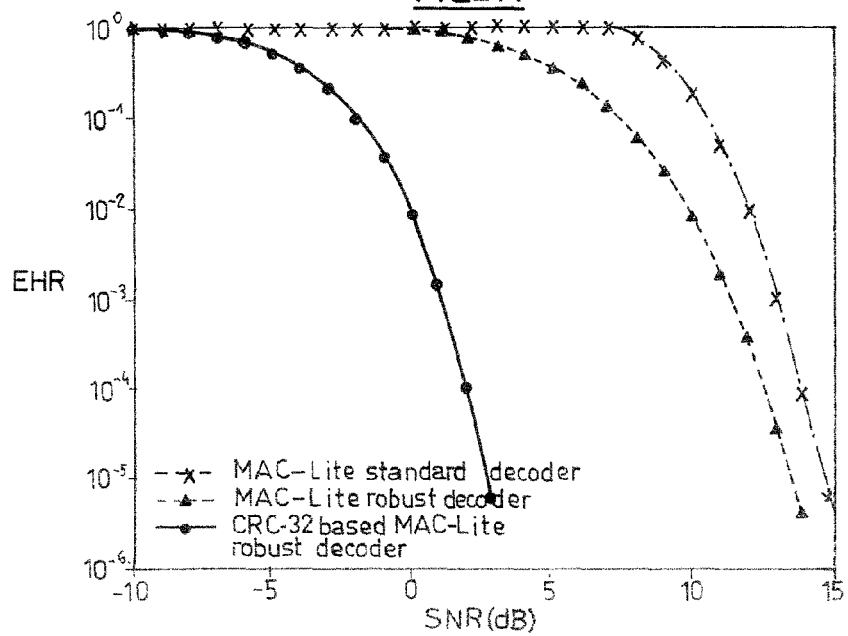
FIG_11

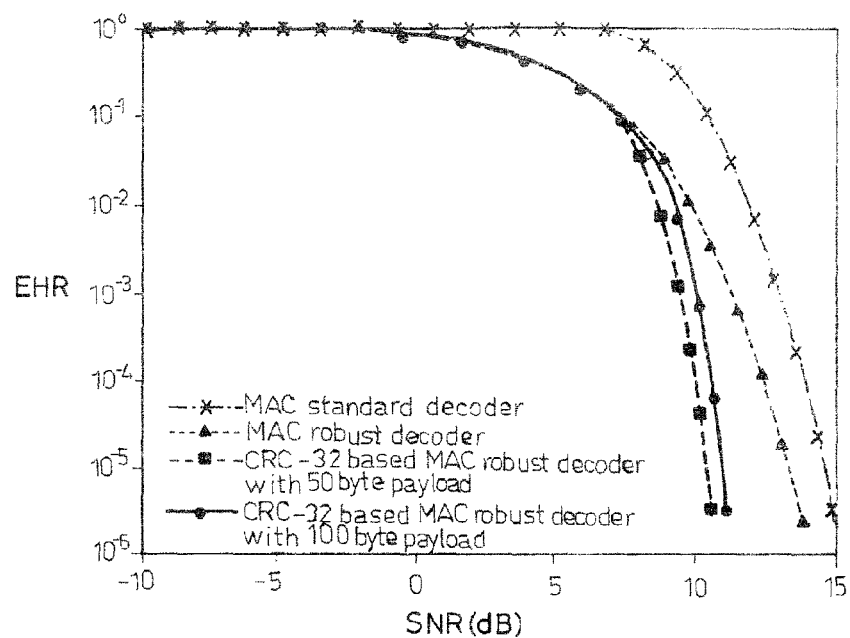
FIG_14
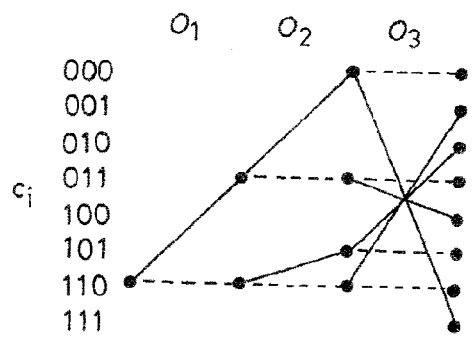
FIG_12
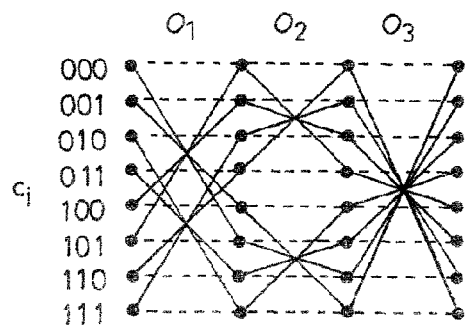
FIG_13

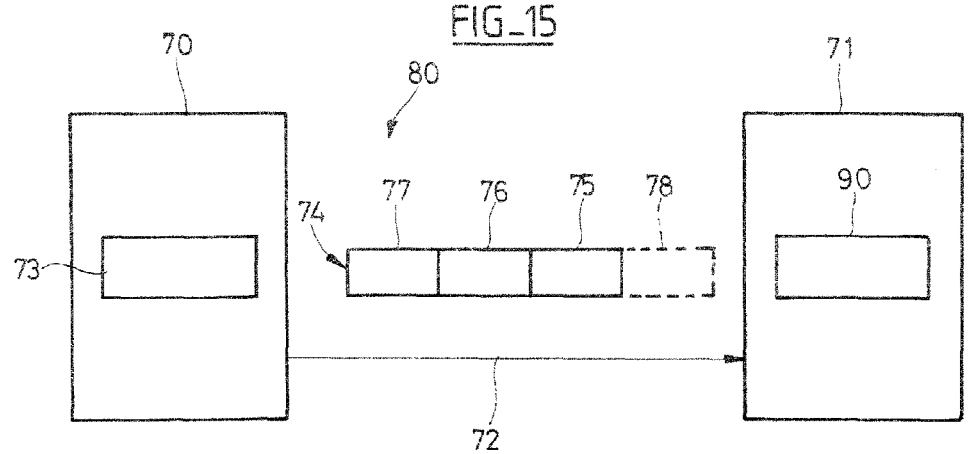
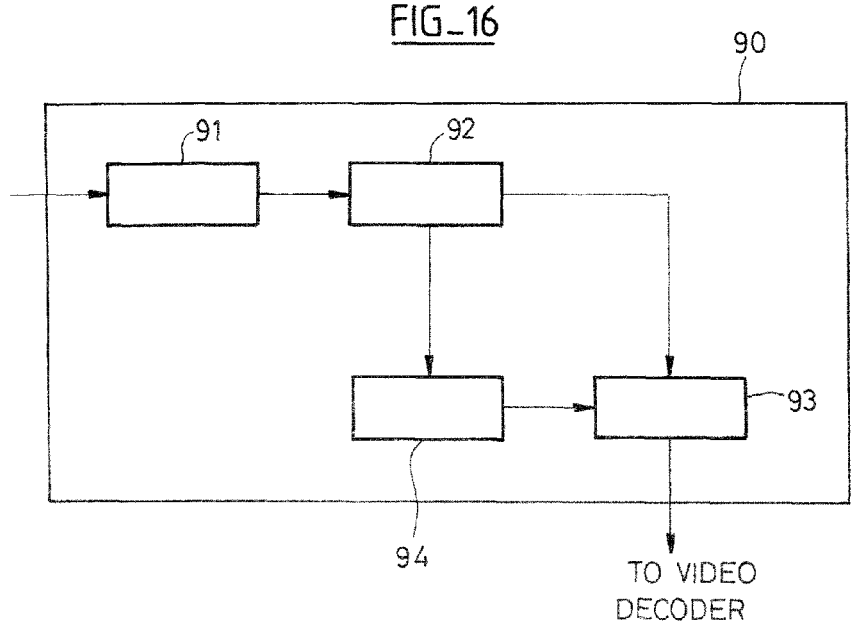

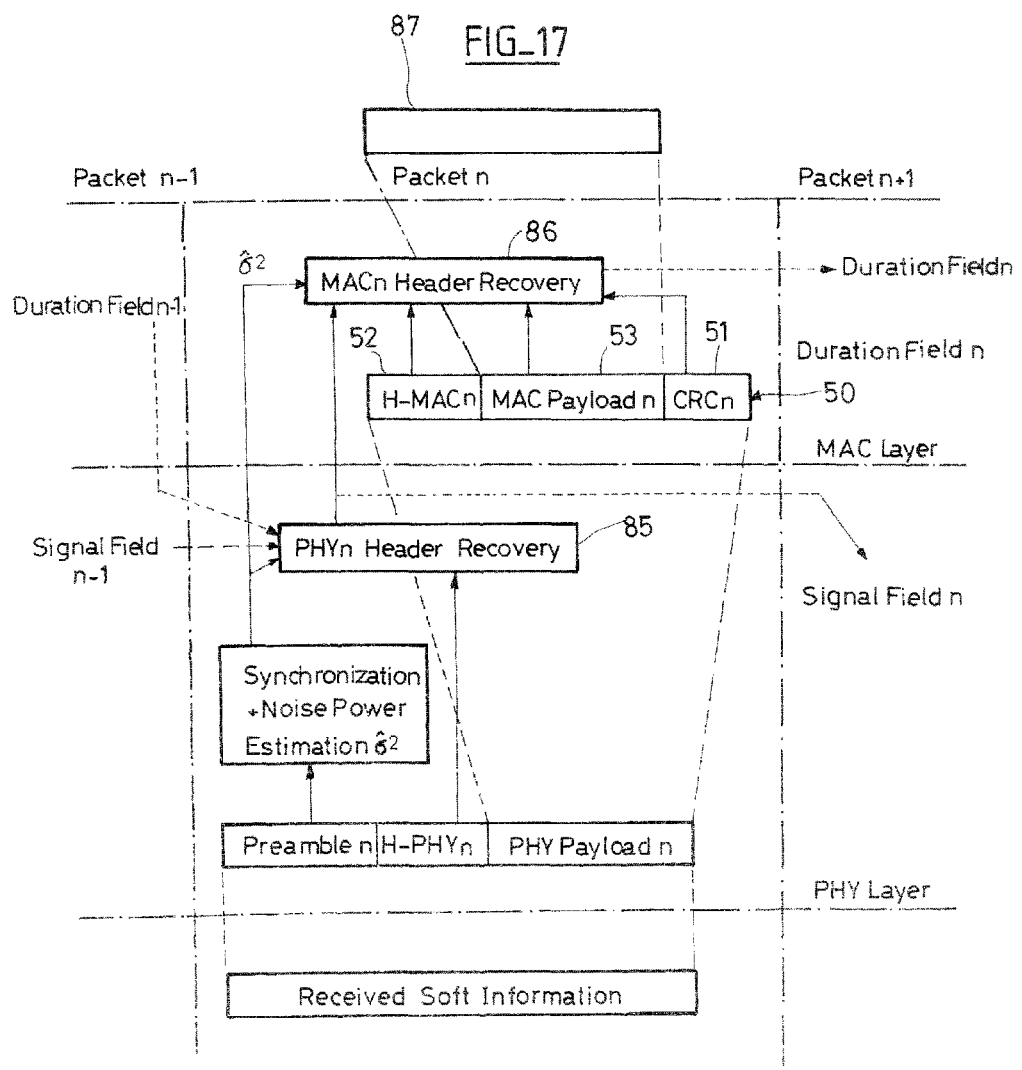

US 8,458,570 B2

RECOVERY OF TRANSMISSION ERRORS

PRIORITY STATEMENT

This application is the national phase under 35 U.S.C. §371 of PCT International Application No. PCT/EP2009/055476 filed May 6, 2009, which claims priority to European Application No. 08305153.2 filed May 6, 2008, all of which are hereby incorporated by reference in their entirety.

FIELD OF THE INVENTION

The invention relates to the field of data transmission and recovery of transmission errors, especially using protocol data units corresponding to a protocol or a stack of several protocol layers.

BACKGROUND OF THE INVENTION

Most networking communication processes are modeled in layers. This layered representation leads to the term protocol stack, which refers to the stack of layers in the protocol suite. By dividing the communication processes into layers, the protocol stack allows for division of labor, ease of implementation, e.g. through software, ease of software code testing, and the ability to develop alternative layer implementations. Layers communicate with those above and below via concise interfaces. In this regard, a layer provides services for the layer directly above it and makes use of services, e.g. a transport service, provided by the layer directly below it. At each layer, the protocol refers to a set of rules necessary to provide the services of the layer.

In a communication network, network devices implementing a given protocol layer send or receive data under the form of Protocol Data Units (PDU). The coding syntax of the PDUs is an attribute of the protocol layer. A PDU includes control data of the protocol layer and service data. The service data is the client data, i.e. data coming from an interface of the protocol layer and for which the services of the layer are used. Oftentimes, the service data is referred to as payload. The control data is data necessary to specify and control the services provided by the protocol layer. Usually, the control data is disposed in a header of the PDU.

SUMMARY OF THE INVENTION

According to a first object, an embodiment of the invention provides a method for recovering transmission errors, comprising the steps of:
receiving a protocol data unit corresponding to a protocol layer, wherein a format of said protocol data unit includes at least one control field for control data, at least one error detection field for an error detection code associated to said control data, and at least one service field for service data,
checking the error detection code of the protocol data unit to detect an erroneous state of the control data,
when the erroneous state is detected, determining a finite set of candidate values for the control data and determining error detection code values associated to the candidate values of the set,
determining first correlations i.e. similarities between the control data of the received protocol data unit and the respective candidate values,
determining second correlations i.e. similarities between the error detection code of the received protocol data unit and error detection code values associated to the respective candidate values,
and selecting a corrected value for the control data among the set of candidate values as a function of said first and second correlations.

In particular embodiments, the step of determining candidate values comprises determining a single candidate value for a first portion of the control field and determining multiple candidate values for a second portion of the control field and combining the single candidate value of the first portion with each candidate value of the second portion of the control field. In embodiments, the first portion of the control field comprises one or more subfields of the control field. Such subfields may be referred to as known or predictable fields. In embodiments, the second portion of the control field comprises one or more subfields of the control field. Such subfields may be referred to as unknown fields.

In accordance with the first object, an embodiment of the invention provides also a device for recovering control data in a protocol data unit corresponding to a protocol layer, wherein a format of said protocol data unit includes at least one control field for control data, at least one error detection field for an error detection code associated to said control data, and at least one service field for service data, the device comprising:
an input means for receiving a protocol data unit,
an error detection code checking means for checking the error detection code of the protocol data unit to detect an erroneous state of the control data,
a control data correction means operable to determine a finite set of candidate values for the control data, to determine error detection code values associated to the candidate values of the set, to determine first correlations between the control data of the received protocol data unit and the respective candidate values, to determine second correlations between the error detection code of the received protocol data unit and error detection code values associated to the respective candidate values, and to select a corrected value of the control data among the set of candidate values as a function of said first and second correlations.

In accordance with a second object, an embodiment of the invention provides a method for recovering transmission errors, comprising:
receiving a data packet comprising an error detection code associated to at least some of the data contained in the packet, wherein the data associated to the error detection code comprises primary data and secondary data,
checking the error detection code of the received packet to detect an erroneous state of the associated data,
when the erroneous state is detected, determining a finite set of candidate values for the primary data and, for each candidate values of the set:
determining a marginal likelihood of the candidate value as a function of the error detection code of the received packet,
determining a first correlation between the primary data of the received packet and the candidate value, and
selecting a corrected value for the primary data among the set of candidate values as a function of said marginal likelihoods and said first correlations.

This method may be used for correcting errors found in the primary data, if any, without necessarily attempting to correct errors found in the secondary data, if any. In embodiments, the primary data includes data with a higher importance or higher priority or higher reliability-constraint than the secondary data. Such a method can be applied in a protocol layer decoder for recovering the control data necessary for the processing of a PDU, whereas the service data is treated as secondary data.

In an embodiment, the step of determining a marginal likelihood of the candidate value comprises:
determining a finite set of potential values for the secondary data,
sorting the potential values of the secondary data into subsets associated to respective error detection code values, wherein all the potential values of the secondary data within a subset are selected to yield the associated error detection code value when combined with the candidate value of the primary data,
for each subset, determining a marginal likelihood of the secondary data belonging to the subset as a function of the secondary data of the received packet and the error detection code of the received packet,
determining said marginal likelihood of the candidate value by cumulating said marginal likelihoods for all said subsets.

In an embodiment, the step of determining the marginal likelihood of the secondary data belonging to a subset comprises:
determining a second correlation between the error detection code value associated to the subset and the error detection code of the received packet,
determining third correlations between the potential values of the secondary data within the subset and the secondary data of the received packet, and
determining the marginal likelihood of the secondary data belonging to the subset as a function of said second correlation and said third correlations.

In an advantageous embodiment, the step of determining a marginal likelihood of the candidate value comprises:
splitting the error detection code of the received packet into a plurality of blocks,
for each block of the error detection code of the received packet, determining a partial marginal likelihood of the candidate value as a function of said block, and determining said marginal likelihood of the candidate value as a function of the partial marginal likelihood associated to all blocks of the error detection code.

In an embodiment, the step of determining a partial marginal likelihood of the candidate value comprises:
determining a finite set of potential values for the secondary data,
sorting the potential values of the secondary data into subsets associated to respective values of the block of the error detection code, wherein all the potential values of the secondary data within a subset are selected to yield the associated block value when combined with the candidate value of the primary data,
for each subset, determining a partial marginal likelihood of the secondary data belonging to the subset as a function of the secondary data of the received packet and the block of the error detection code of the received packet, and
determining said partial marginal likelihood of the candidate value by cumulating said partial marginal likelihoods for all said subsets.

In an embodiment, the step of determining the partial marginal likelihood of the secondary data belonging to a subset comprises:
determining a second correlation between the block value associated to the subset and the block of the error detection code of the received packet,
determining third correlations between the potential values of the secondary data within the subset and the secondary data of the received packet, and
determining the partial marginal likelihood of the secondary data belonging to the subset as a function of said second correlation and said third correlations.

In an embodiment, the step of sorting the potential values of the secondary data into subsets associated to respective error detection code values or respective block values comprises constructing a trellis representation of the potential values of the secondary data.

In an embodiment, the trellis representation is constructed from a lower depth value to a higher depth value, wherein the depth of the trellis represents a number of bits of secondary data already determined.

In another embodiment, the trellis representation is constructed from a higher depth value to a lower depth value, wherein the depth of the trellis represents a number of bits of secondary data already determined.

In an embodiment, the same set of secondary data potential values is used for all candidate values of the primary data. Then this set may be determined only once. In other embodiments a different set of secondary data potential values may be used for different candidate values of the primary data.

In an embodiment, the finite set of potential values for the secondary data comprises all possible combinations of binary values for each and every bit of data of a field of the packet reserved for secondary data.

In an embodiment, the packet comprises a protocol data unit, wherein the primary data includes control data of the protocol data unit and the secondary data includes service data of the protocol data unit. The method may comprise the step of processing the service data of the received protocol data unit as a function of the corrected value of the control data.

In another embodiment, the packet comprises video data coded with a scalable video codec, wherein the primary data includes video data corresponding to a base layer and the secondary data includes video data corresponding to an enhancement layer.

In accordance with the second object, an embodiment of the invention provides a device for recovering transmission errors, comprising:
an input means for receiving a data packet comprising an error detection code associated to at least some of the data contained in the packet, wherein the data associated to the error detection code comprises primary data and secondary data,
an error detection code checking means for checking the error detection code of the received packet to detect an erroneous state of the associated data,
and a primary data correction means operable to determine a finite out of candidate values for the primary data and, for each candidate values of the set, to determine a marginal likelihood of the candidate value as a function of the error detection code of the received packet, to determine a first correlation i.e. similarities between the primary data of the received packet and the candidate value, and to select a corrected value for the primary data among the set of candidate values as a function of said marginal likelihoods and said first correlations.

In accordance with a third object, an embodiment of the invention provides a method for transmitting video data, comprising the steps of:
encoding a sequence of pictures with a scalable video codec to produce a first bistream corresponding to a base layer and a second bitstream corresponding to an enhancement layer,
producing a sequence of data packets, wherein each packet comprises primary data belonging to the first bitstream, secondary data belonging to the second bitstream and an error detection code associated the primary and the secondary data, and transmitting the sequence of data packets through a communication channel, e.g. using any appropriate transmission protocol or stack of protocols.

The subclaims define further embodiments of the invention. Other embodiments result form combinations of the claims.

Embodiments of the invention are based on the idea of using an error detection code for detecting and recovering transmission errors in selected portions of a PDU or packet, while disregarding potential errors affecting other portions of the PDU or packet. Embodiments of the invention can be applied to permeable protocol layer decoders operable to deliver a payload of the PDU regardless of its validity.

BRIEF DESCRIPTION OF THE DRAWINGS

These and other aspects of the invention will be apparent from and elucidated with reference to the embodiments described hereinafter, by way of example, with reference to the drawings.

FIG. 1 is a diagrammatic representation of a decoder module in accordance with an embodiment of the invention.

FIG. 2 is a diagrammatic representation of a method for operating a permeable protocol layer, which may be executed by the decoder module of FIG. 1.

FIG. 3 represents an embodiment of a protocol stack and corresponding encapsulation scheme, in which the method of FIG. 2 may be used.

FIG. 4 is a diagrammatic representation of a communication network, which may use the protocol stack of FIG. 3.

FIG. 5 represents a data receiver in accordance with an embodiment of the invention, which may be used in the communication network of FIG. 4.

FIGS. 6 and 7 represent packet formats corresponding to standard 802.11 PHY and MAC protocol layers respectively.

FIG. 8 represents a transmission method, which may be used in the communication network of FIG. 4.

FIG. 9 is a diagrammatic representation of a method for operating a permeable PHY protocol layer in accordance with an embodiment of the invention.

FIG. 10 is a graph showing the performance of a PHY layer decoder in accordance with an embodiment of the invention.

FIG. 11 is a graph showing the performance of a MAC-Lite layer decoder in accordance with an embodiment of the invention.

FIGS. 12 and 13 are trellis diagrams.

FIG. 14 is a graph showing the performance of an embodiment of a MAC layer decoder.

FIG. 15 is a diagrammatic representation of a transmission system in accordance with an embodiment.

FIG. 16 shows an embodiment of a decoder module, which may be used in the transmission system of FIG. 15.

FIG. 17 is a diagrammatic representation of a method for combining a permeable PHY protocol layer and a permeable MAC protocol layer in accordance with an embodiment of the invention.

DETAILED DESCRIPTION OF ILLUSTRATIVE EMBODIMENTS

FIG. 1 is a diagrammatic representation of a decoder module 10 for decoding a protocol data unit corresponding to a predefined protocol. The decoder module 10 is intended to be used in a receiver, which receives data encoded in accordance with the protocol under consideration or a corresponding protocol stack from a transmitter over a communication channel. In the protocol under consideration, a format of the protocol data unit includes at least one control field for control data, at least one error detection field for an error detection code associated to all or part of said control data, and at least one service field for service data. In an embodiment, the PDU is a packet and the control field is a header of the packet.

The error detection code can be any type of redundant information computed at the transmitter from the data to be covered, i.e. all or part of the content of the control field, in order to allow detecting transmission errors at the receiver. In embodiments, the error detection code is a checksum or a Cyclic Redundancy Check (CRC) or a Forward Error Correction code (FEC).

The decoder module 10 comprises on input module 1 for receiving the protocol data unit. The protocol data unit may be obtained in diverse manners, depending on the protocol layer under consideration. In an embodiment, e.g. corresponding to a physical layer decoder, the input module receives the PDU from a detection module, not shown, which scans a received sequence of data to detect the PDU. The PDU can be recognized by detecting a predefined sequence of data, e.g. a known preamble. In another embodiment, the input module receives the PDU from another decoder module corresponding to a lower protocol layer.

Having received the PDU, the input module 1 identifies the control field and error detection field in accordance with the predefined format of the PDU and passes the content of those fields to an error detection code-checking module 2, which uses the error detection code of the received PDU to check the integrity of the corresponding control data. If the error detection code check is successful, i.e. reveals no transmission error, the control data of the protocol data unit is assumed to be correct. Then the PDU is passed to a processing module 3, which processes the PDU in accordance with the functions of the protocol and the control data of the PDU.

The functions of the processing module 3 depend on the services being implemented by the protocol layer. Functions of the processing module 3 may include e.g. re-sequencing several PDUs, e.g. as a function of a sequence number included in the control data, delimiting and decapsulating the service data, e.g. as a function of a length included in the control data, assembling or concatenating the service data of several PDUs, segmenting the service data of a PDU, selecting a destination where the service data must be outputted, e.g. for protocol demultiplexing as a function of a protocol identifier included in the control data. Other types of services will be apparent to those skilled in the art. The processing performed by the processing module 3 causes the service data of the PDU to be sent, in full or in part, or in a concatenated or segmented form as the case may be, to an output 4 of the decoder module 10. In an embodiment, e.g. where the received data corresponds to a protocol stack, the output 4 delivers the service data of the PDU to a higher protocol layer decoder and the processing module 3 operates to put the service data in a form adapted to this higher protocol layer decoder. Although a single output is shown, the decoder module 10 may comprise several outputs, e.g. for outputting different types of payloads. The processing module may select an output as a function of the control data of the PDU.

In an embodiment, the processing module 3 stores selected portions of the control data of the PDU being processed, e.g. selected subfields of the header, in a caching module 5 to make this data available for use in intralayer or interlayer redundancy techniques, as will be explained below.

When the error detection code check performed by error detection code checking module 2 is unsuccessful, i.e. reveals transmission errors in the control data of the PDU, the PDU is passed to a control data correction module 6, which attempts to recover the control data. The control data correction module 6 determines a finite set of candidate values for the erroneous control data and determines error detection code values associated to the candidate values of the set. Then, the control data correction module 6 uses the error detection code of the received PDU to select the best candidate among the previously determined candidate values. To do so, it compares, on the one hand, the control data and error detection code of the received protocol data unit with, on the other hand, the respective candidate values and associated error detection code values, and selects a corrected value for the control data among the set of candidate values as a function of the comparison results i.e. correlations between the compared data.

Once a corrected value of the control data has been selected, the control data correction module 6 sends the corrected PDU to the processing module 3. The processing module 3 operates as described above, yet as a function of the corrected control data of the protocol data unit in that case.

The set of candidate values could be simply constructed as an exhaustive list of all possible combinations of binary values for each and every bit of data of the control field. This would lead to a computational complexity with an order of magnitude 2l, where l represents the length of the control field in number of bits and '' means 'power'.

In a preferred embodiment, the control data correction module 6 relies on prior knowledge about the control data, i.e. information external to the detected protocol data unit, to construct a more limited set of candidate values. Depending on the control fields, such prior knowledge can be obtained from different sources, e.g. specifications of the protocol layer, interlayer or intralayer redundancy, or a context of the communication in which the sequence of data is received.

Intralayer redundancy refers to the existence of consistent, deterministic relations between several identified items of information transmitted at the same protocol layer, e.g. relations between several fields of a given PDU and/or relations between fields of PDUs transmitted successively at the same protocol layer. Intralayer redundancy may serve to determine a candidate value or set of candidates values for control data of a received protocol data unit as a function of data that was received in an earlier protocol data unit, especially in the control field of the earlier PDU, at the same protocol layer.

Interlayer redundancy refers to the existence of consistent, deterministic relations between several identified items of information transmitted at different protocol layer, e.g. relations between one or more fields of a PDU at a first protocol layer and one or more fields of a PDU at a second protocol layer. Interlayer redundancy may serve to determine a candidate value or set of candidates values for control data of a received protocol data unit at a given protocol layer as a function of data that was received in a protocol data unit, especially in the control field of the PDU, at a different, e.g. higher or lower, protocol layer. To implement intralayer redundancy techniques, the control data correction module 6 may retrieve data from the caching module 5. To implement interlayer redundancy techniques, the control data correction module 6 may retrieve data from similar caching modules at a higher or lower protocol layer, as shown by arrows 7 and 8.

The context of the communication refers to parameters that are known throughout a communication session between a transmitter and a receiver. Such parameters can be fixedly configured in the transmitter and receiver or negotiated at an early stage of the establishment of the communication channel, e.g. in an attachment procedure between a wireless terminal and a wireless base station or access point. Static or dynamic context parameters may also be transmitted in the signaling messages sent by the wireless base station or access point. In an embodiment, the control data correction module 6 may retrieve data from a memory 9 of the receiver where such parameters have been stored, e.g. in configuration files. As a consequence, candidate values for a subfield corresponding to such a parameter may be determined by accessing the memory 9.

In an embodiment, the control data correction module 6 integrates the specifications of the protocol layer under consideration in order to reduce as much as possible the set of candidate values for the control field of the PDU. For example, the specification of the protocol layer may provide a predefined constant value for a subfield of the control field. Accordingly, the control data correction module 6 considers only candidate values in which this subfield is set to the predefined value. For another subfield, the specification of the protocol layer may provide a limited list of possible values. Accordingly, the control data correction module 6 considers only candidate values in which this subfield is set to the values selected in this limited list. Here "limited" means that the list contains fewer values than all combinations of binary values for each and every bit of data of the subfield.

In an embodiment, the control data correction module 6 relies on intralayer redundancy to determine a candidate value for a subfield of the control field, which corresponds to a relatively static parameter i.e. parameter unlikely to change from one received PDU to the next. Intralayer redundancy can also be used to determine a candidate value for a subfield containing a parameter that evolves in a predefined manner from one received PDU to the next, e.g. by incrementing or decrementing the previously received value. For such subfields, the control data correction module 6 determines candidate values for the subfield of the protocol data unit as a function of control data disposed in said subfield in a previously detected protocol data unit.

In some cases, a protocol stack may comprise a plurality of fields at the same or at different protocol layers, which contain information items that are similar or correlated through a predefined correlation law. In a corresponding embodiment, the control data correction module 6 uses such a predefined correlation law in combination with intralayer or interlayer redundancy techniques to determine one or more candidate values for a subfield of the control field of the PDU. For instance, a PDU at a first protocol layer encapsulates a PDU of a second protocol layer, i.e. carries the second layer PDU in the service field. A format of the PDU at the first layer comprises a first subfield representing a length of the service data and a second subfield representing a transmission rote of the service data. A format of the PDU at the second layer comprises a third subfield representing duration for transmitting the next second layer PDU. Hence, the duration received in one second layer PDU makes it possible to determine a relation between the length of the next second layer PDU to be received and the value of the first field in the PDU encapsulating it. Other examples of interlayer redundancy, e.g. similar information items that are transmitted redundantly at different layers, can be found in an IP/UDP/RTP protocol stack.

In a further embodiment, the service field at the first layer is used to carry exactly one PDU of the second layer. A simple relation is thus obtained between the first subfield and the second subfield of a subsequent PDU to be received at the first layer. By retaining only candidate values that satisfy that relation, the control data correction module 6 can heavily reduce the set of candidate values to be considered for correcting the control data of that subsequent PDU, if it has errors.

In a preferred embodiment, the service data of the PDU is not checked for transmission errors by the decoder module 10, in contrast with the control data. Hence, the decoder module 10 implements a so-called permeable protocol layer able to output the payload of a PDU, be it correct or damaged. By allowing correction of erroneous control data in the received PDUs, the decoder module 10 is able to interpret and process a higher proportion of the received PDUs at the corresponding protocol layer, hence increasing the quantity of service data, e.g. number of payloads, reaching the next protocol layer or application layer. Preferably, the decoder module 10 receives the service data of the protocol data unit as soft information and processes it under that form, no that soft information corresponding to the service data is outputted to the next protocol layer or application layer. Here, soft information refers to a sampled signal which comprises several levels between an 'L' level indicative of a logic '0' and an 'H' level indicative of a logic '1'. By contrast, hard information refers to a sampled signal, which is only quantified in terms of logic '0's and logic '1's. Passing the soft information of the service data to the next layer makes it possible to use efficient decoding techniques or error correction techniques at the next layer. In an embodiment, application data in the form of soft information is passed through one or more permeable protocol layers of the receiver to an application layer implementing a joint source-channel decoding technique, which allows many errors to be corrected. Various robust joint source-channel decoders are known in the art, e.g. R. Bauer and J. Hagenauer. "On Variable Length Codes for Iterative Source/Channel Decoding", in Proceedings of DCC, pages 272-282, Snowbird, Utah, 1998.

In a preferred embodiment, the decoder module 10 receives part or all of the PDU in the form of soft information and the control data correction module 6 uses the soft information of the control data to select the best-matching candidate value. In that embodiment, the control data correction module 6 computes the correlations with the control data and error detection code of the received protocol data unit provided as soft information. Using soft information in the computation improves the accuracy of the selection step.

In a modified embodiment, the error detection code checking module may be suppressed so that the control data correction muddle 6 receives every PDU from the input module 1 and handles them similarly.

Enhanced Permeable Layer Mechanism

FIG. 2 is a diagrammatic representation of a method for sending soft information from a protocol layer L−1 to a protocol layer L+1 through a permeable protocol layer L. A decoder module as shown on FIG. 1 can implement the processing at permeable protocol layer L.

In the method of FIG. 2, the protocol layer L receives a sequence of soft information 100, which includes a PDU of layer L 11. For example, the sequence of soft information 100 is provided by the lower protocol layer L−1 that obtained it by decapsulating the payload of one or more PDUs of layer L−1. In this embodiment, the control field of the PDU 11 is a header 12 and the error detection code field is a trailer 13 containing a CRC or checksum associated to the header. In FIG. 2, 'n' is an index that refers to a PDU being currently processed, whereas 'n−1' refers to previously processed PDU. The header 12 and trailer 13 are converted to hard information to perform a CRC check, in order to detect whether the received header is erroneous. If not, the PDU is processed as a function of the information contained in the header 12. As a result, the payload 14 of the PDU is decapsulated and passed as soft information to its intended destination, i.e. protocol layer L+1.

If the CRC check reveals errors, a header recovery step 15 is performed. The header recovery step involves two main principles. Firstly, intra-layer and/or inter-layer redundancy is used to build some a priori information on candidate values for the header. Arrows 16 and 17 represent various sources of redundancy, which can be used to facilitate the header recovery at layer L. Secondly, the CRC or checksum of PDU 11 is used as an error-correcting code to select a best-matching corrected value. Hence, the header recovery step combines soft information provided by the lower protocol layer, properties of the CRC or checksum, as well as previously introduced a priori information. Although the header 12 is removed after decoding, its information fields are necessary to deliver the payload 14 to layer L+1, for further processing. In the embodiment shown, the payload 14 comprises a PDU 18 of layer L+1.

MAP Estimator for Robust Header Recovery

Next, a generic model of a PDU, e.g. a packet, and of a corresponding header recovery method will be described. This model enables one skilled in the art to implement the method of FIG. 2 with any given protocol.

At a given layer L, incoming packets include one or more control fields, e.g. a header, one or more service fields, e.g. a payload, and an error detection field, e.g. a CRC. Information protected by the CRC c of lc bits can be split into four parts. The constant fields, represented by the vector k of lk bits, are assumed to be known, e.g. as constant values of the protocol specification. The predictable fields are embedded in the vector p of lp bits. Contrary to known fields, the predictable fields are estimated by exploiting the intra-layer and inter-layer redundancy represented by R. They are predicted by using information contained in the previous received packets. The predictable fields are assumed to be entirely determined if the preceding packets have been correctly received. The important unknown fields are collected in the vector u of lu bits. These parameters are either completely unknown or limited to a finite set of values $\Omega u(k, p, R)$, which content may be a function of the values of k, p and R. Finally, the vector o of lo bits contains the other fields covered by the CRC, if any. This last part contains unknown data, which are not required for the processing of the packet at layer L, but which may be important at layer L+1.

All these fields are collected in a vector r=[k, p, u, o] of lr=lk+lp+lu+lo bits. The order of the bits in vector r may not correspond to the order in which data is transmitted in a packet.

The CRC c associated to r is evaluated as c=F (r), where F is a generic encoding function. More precisely, the evaluation of c depends on a generator polynomial characterizing the CRC:

$$g(x) = \sum_{i=0}^{\ell_c} g_i x^i$$

A systematic generator matrix G=[I,Π] can be associated to g(x). Using G, c may be obtained iteratively as follows:

$$\begin{cases} c^0 = 0, \\ c^{j+1} = \mathcal{F}(r^{j+1}) = c^j \oplus (r_{j+1} \cdot \pi(j+1)). \end{cases} \quad \text{Eq. (1)}$$

where 'j' is on index denoting the number of iterations.

In Eq. (1), $r^j=[r_1 \ldots r_j, 0 \ldots 0]$ and $\oplus$ is the XOR operator. $\pi(j)$ represents the parity vector related to bit rj and does not necessarily correspond to the j-th line of Π. After lr iterations, $c^{l_r}$=F (r).

Additionally, we consider that data have been transmitted over an Average White Gaussian Noise channel introducing a noise of zero mean and variance $\sigma^2$. Noisy data and CRC coming from layer L−1 are denoted by $$y = [y_k, y_p, y_u, y_o, y_c], \quad \text{Eq. (2)}$$

which includes observations of k, p, u, o and c. Since k and p are known or may be predicted, only u remains to be estimated. A maximum a posteriori estimator (MAP estimator) is developed, taking into account the observations y, the knowledge of k and p, the redundancy R as well as the CRC properties useful to estimate u:

$$\hat{u}_{MAP} = \underset{u}{\operatorname{argmax}} P(u \mid k, p, R, y_u, y_o, y_c) \quad \text{Eq. (3)}$$

Here, the notation P(.|.) denotes a conditional probability. After some derivations, one obtains:

$$\hat{u}_{MAP} = \underset{u}{\operatorname{argmax}} P(u, y_u, y_o, y_c \mid k, p, R). \quad \text{Eq. (4)}$$

The channel is memory less. Assuming that o is independent of R, one may write:

$$P(u, o, y_u, y_o, y_c \mid k, p, R) = P(u \mid k, p, R) P(y_u \mid u) P(o, y_o, y_c \mid k, p, u). \quad \text{Eq. (5)}$$

In Eq. (5), P(u|k, p, R) represents the o priori probability of u and $P(y_u|u) \sim N(u, \sigma^2 I_{l_u})$, where N(.,.) denotes a Gaussian law with the first argument being the mean value and the second argument being the variance.

The possible values of u, i.e. those retained as candidate values, are gathered in:

$$\Omega_u = \Omega_u(k, p, R).$$

Assuming that combinations of u are equally likely, one gets $$P(u \mid k, p, R) = P(u \mid \Omega_u) = \frac{1}{\operatorname{card}(\Omega_u)}$$

Marginalizing Eq. (5) over the 2**lo combinations of o, one obtains:

$$P(u, y_u, y_o, y_c \mid k, p, R) = \quad \text{Eq. (6)}$$
$$P(u \mid \Omega_u) P(y_u \mid u) \sum_o P(o, y_o, y_c \mid k, p, u).$$

The properties of the CRC are involved in:

$$\sum_o P(o, y_o, y_c \mid k, p, u)$$

Finally, combining Eq. (6) in Eq. (3), the MAP estimator is expressed as:

$$\hat{u}_{MAP} = \underset{u \in \Omega_u}{\operatorname{argmax}} P(y_u \mid u) \Psi(k, p, u, y_o, y_c) \quad \text{Eq. (7)}$$

where $$\Psi(k, p, u, y_o, y_c) = \sum_o P(o, y_o, y_c \mid k, p, u)$$

represents a marginal likelihood of the vector [k, p, u] as a function of the observations of the error detection code $y_c$ and the other data $y_o$.

The above categorization of the fields is intended to encompass most transmission protocols. Some field categories may not apply to a specific protocol under consideration. In other words, in specific instances, some of the field categories are considered as empty, e.g. known fields k, predictable fields p and/or other fields o.

First Embodiment of the MAP Estimator

In a preferred embodiment, the CRC covers only the control data at layer L, i.e. the header. Then, o is empty and the sum in Eq. (6) becomes:

$$\sum_{o \neq \theta} P(o, y_o, y_c \mid k, p, u) = P(y_c \mid \mathcal{F}([k, p, u])).$$

In this case, Eq. (7) simplifies to $$\hat{u}_{MAP} = \underset{u \in \Omega_u}{\operatorname{argmax}} P(y_u \mid u) P(y_c \mid \mathcal{F}([k, p, u])) \quad \text{Eq. (8)}$$

In Eq. (8), [k, p, u] vectors represent a set of candidate values for the erroneous control data and F([k, p, u]) vectors represent error detection code values associated to the candidate values of the set, which can be directly evaluated by Eq. (1), e.g. an elementary CRC computation. Since a sum over all possible values of vector o is not needed in that case, the computational complexity is heavily reduced in comparison to Eq. (7). Whereas vectors k and p refer to one or more fields of the header that are fixed for a given PDU, u refers to one or more fields that may take multiple values, i.e. any value selected in the finite set Ωu. The conditional probabilities in Eq. (7) can be evaluated by computing corresponding correlation functions, i.e. a correlation between the observed value of the unknown field and the respective candidate values for the unknown field for the first one, and a correlation between the observed value of the error detection code field of the PDU and the error detection code values associated to the respective candidate values for the control data.

Such correlations may be computed as a Euclidian distance between hard decision data. When the observations y are provided as soft data, a soft channel decoder can be used to determine a likelihood parameter for each possible state of a bit, i.e. a likelihood parameter for the bit being a '1' and a likelihood parameter for the bit being a '0'. Then a correlation between the hard data of the candidate value and the soft data of the observation may be computed as a weighted Euclidian distance, where the likelihood parameters are used as weight factors.

In general, solving Eq. (8) allows selecting a single corrected value for the control data among the set of candidate values. In embodiments, transmission errors affecting only the error detection code can also be corrected by this method.

In Eq. (8), the known and predictable fields are not taken into consideration in the first conditional probability. However, they may be taken into consideration in a modified embodiment. Since these fields are single-valued, they do not contribute to discriminate between the respective candidate values for the control data anyway.

As mentioned before, deterministic relation laws between fields at a given layer, i.e. intralayer relations or at different layers, i.e. interlayer relations facilitate the recovery of erroneous headers, since they allow reducing the size of the Ωu set.

Application to 802.11 Standard

Embodiments of an IEEE 802.11 (WiFi) network will now be described, in which header recovery methods are implemented at a PHY layer and/or at a MAC layer.

FIG. 3 illustrates an example of an RTP/UDP/IP protocol stack, which can be used for multimedia packet transmission in combination with the 802.11 standard (WiFi). 'H' denotes a header of the respective PDUs and APL refers to an application layer. At PHY layer, a CRC protects the header fields. At MAC layer, a CRC protects the header and the payload. At IPv4 layer, the header fields are protected by a checksum. At UDP layer, a checksum protects the header and the payload.

The 802.11 standard can be combined with other protocols. The protocol stack of FIG. 3 is not limitative. The segmentation and encapsulation mechanisms depicted at each protocol layer in FIG. 3 are purely illustrative and not limitative.

FIG. 4 represents an embodiment of a network architecture, in which the protocol stack of FIG. 3 can be used. In this embodiment, we consider a downlink multimedia transmission over the 802.11 radio interface between an access point AP and a terminal T1. The multimedia stream 25 comes from a media server 20, e.g. through a wide area network 21 and a router R1.

FIG. 5 is a diagrammatic representation of a receiver device 30 comprised in the terminal T1 to receive and decode the media stream. The receiver device 30 comprises a radio front-end 31 and a series of decoder modules 32 to 37 corresponding to the respective protocol layers. The radio front-end 31 demodulates the received radio signal and passes the baseband signal, preferably in the form of soft information, to the PHY decoder module 32.

With reference to FIGS. 6 and 7, PHY and MAC layer specifications are now briefly recalled.

DSSS PHY Layer Description

At PHY layer, the 802.11 standard provides 1 or 2 Mbps transmission rate in the 2.4 GHz band using either Frequency Hopping Spread Spectrum (FHSS) or Direct Sequence Spread Spectrum (DSSS). In DSSS, an 11 chip Barker code sequence is used for spreading the 1 Mbps bit stream. The coded flow thus represents an 11 MHz baseband signal. A Differential BPSK (DBPSK) or Differential QPSK (DQPSK) modulation is applied to provide the 1 Mbps or 2 Mbps bit rate respectively.

The DSSS PHY packet format 40 is illustrated in FIG. 6. The preamble 41 and the header 42 are transmitted by using the 1 Mbps DBPSK modulation while the payload 43 is modulated either in 1 Mbps DBPSK or 2 Mbps DQPSK. In such PHY packets, the SYNC field 44 and SFD field 45 consist of 144 known bits, which are not protected by the CRC. These fields may be used to estimate the variance of the noise introduced by the channel.

The CCITT CRC-16 field 46 of 2 bytes protects the Signal field 47, Service field 48, and Length field 49. Using the notations of the generic model above, the field 46 will be denoted $c^{PHY}$ and its associated encoding function is denoted by $F^{PHY}$. The payload 43, assumed to contain only one MAC packet in this example, is not protected at this layer. Service field 48 is reserved for future recommendation. It is set to $00_{16}$, and included in $k^{PHY}$, according to the notations of the generic model. The value of the Signal field 47 indicates the payload modulation and may only be equal to $0A_{16}$ or $14_{16}$ for 1 or 2 Mbps bit rate respectively. The value of the Length field 49 indicates on 2 bytes the number of microseconds required to transmit the payload 43. It depends on both the bit rate and the payload size. It may range from 16 to (2**16−1). Using the notations of the generic model above, Signal 47 and Length 49 form thus the vector $u^{PHY}$. At this layer, the vectors $p^{PHY}$ and $o^{PHY}$ are empty.

MAC Layer Description

The MAC packet format 50 is depicted in FIG. 7. In this packet, the CRC field 51 of 4 bytes, denoted $c^{MAC}$, protects both the header field 52 and the payload 53. Its encoding function is denoted $F^{MAC}$.

Considering a specific communication context, e.g. a non-encrypted downlink transmission of ordered MAC data packets with deactivated retransmission and power-save mode, all the subfields of the 2 byte Frame Control field 54 are either known or easily predicted, except the More Frog flag 55 which will vary more dynamically. The 6 byte Address field 56 contains the MAC address of the terminal T1 and is thus known. The last field 57 of the MAC header is reserved for local wireless networks. It is composed of 6 bytes of zeros when not used. Using the notations of the generic model, all the previously mentioned fields may thus be embedded in $k^{MAC}$ or $p^{MAC}$.

The 6 byte Address field 58 contains the MAC address of the access point AP. This address is transmitted to the terminal T1 during the medium reservation procedure (RTS-CTS) and will thus remain known by the receiver during the whole communication session. The 6 byte Address field 59 corresponds to the MAC address of the router R1. As soon as the access point AP has already received the router address in one information packet, the Address field 59 may be easily predicted by the receiver for subsequent packets if the access point AP is connected to a single router.

The 2-byte Sequence Control field 60 contains two parameters: a sequence number and a fragment number. The sequence number represents the value of the current IP packet counter. The fragment number indicates the value of the current MAC packet counter. Assuming that packets are transmitted in order, these parameters can be easily determined: the sequence number is incremented by one for each RTS-CTS and the fragment number is incremented by one for each received MAC packet. Thus, the receiver may estimate the Sequence Control field 60 by incrementing the previously received value. All these predictable single-valued fields may thus be treated as belonging to $p^{MAC}$.

The More Frag flag 55 specifies if the current MAC packet is the last one for a sequence of fragments of an IP packet. The 2 bytes of Duration field 61 indicates the number of microseconds required to transmit the next MAC packet and some control parameters. Its value depends on the current modulation and the size of the next MAC packet. These two fields are embedded in the vector $u^{MAC}$ of the generic model. Finally, the payload contains the data to be transmitted and its size is between 0 and 2312 bytes. It is represented by $o^{MAC}$.

In on embodiment, in order to allow for some packet loss and/or some degree of packet re-ordering, the receiver can build a limited set of candidate values for the Sequence Control field 60 by considering all the values that fall within a limited range from the last received value, e.g. between −10 and +10. Then this field must be considered in vector $u^{MAC}$ instead of $p^{MAC}$.

In an embodiment, in order to allow for several routers, the receiver can build a limited set of candidate values for the Address field 59 by accessing a list of most recent or most frequent values. Then this field must be considered in vector $u^{MAC}$ instead of $p^{MAC}$.

Interlayer Correlations

To explain correlations between the 802.11 PHY and MAC layers, the transactions at MAC layer will now be described. FIG. 8 illustrates the 802.11 MAC transmission protocol when two MAC data packets have to be delivered. Transmission is initialized by medium reservation procedure consisting in an RTS-CTS exchange between the access point AP and terminal T1. Data packets are then transmitted to terminal T1, which acknowledges them (ACK). Control packets such as RTS, CTS, and ACK are assumed to be correctly received by terminal T1. Only errors in the data packets will be considered. A Short Inter-Frame Space (SIFS) of 10 μs separates each packet to avoid collision. When all the packets are received by terminal T1, the transmission is finished and a Distributed Inter-Frame space (DIFS) of 50 μs precedes the next medium reservation procedure. A Duration field 61 is included in each packet and its value indicates the number of microseconds required to transmit the next packet. The Duration value allows to adjust the Network Allocation Vector (NAV) for the other terminals. The other stations cannot communicate during the NAV period to avoid interferences.

Next, $D^{MAC}_n$ and $B^{PHY}_n$ denote the value of Duration field 61 and of the transmission bit rate coded in Signal field 47 associated to the n-th packet transmitted by the access point AP (either RTS or data packets). Following the MAC layer specifications of 802.11 standard, $D^{MAC}_n$ is defined as:

$$D^{MAC}_n = 3T_{SIFS} + 3T_{OVH} + 2\frac{l_{C-A}}{B^{PHY}_n} + \frac{l^{PHY}_{x,n+1}}{B^{PHY}_n} \qquad \text{Eq. (12)}$$

except for the last packet of a sequence of fragments of an IP packet, i.e., when the value of More Frag $M^{MAC}_n=0$. In this case, one has:

$$D^{MAC}_n = T_{SIFS} + T_{OVH} + \frac{l_{C-A}}{B^{PHY}_n} \qquad \text{Eq. (13)}$$

In Eqs. (12) and (13), $T_{SIFS}$ denotes the duration of a SIFS and $T_{OVH}$ represents the duration for transmitting at 1 Mbps the PHY overhead of constant size composed of the preamble and the header. The other terms of Eq. (12) depend on the current bit rate $B^{PHY}_n$. CTS and ACK have the same constant size $l_{C-A}$, and $l_{C-A}/B^{PHY}_n$ corresponds to the duration for sending one of these packets. Finally, $l^{PHY}_{x,n+1}/B^{PHY}_n$ refers to the transmission duration of the next PHY payload of $l^{PHY}_{x,n+1}$ bits.

PHY Header Recovery

For a given packet 'n' at PHY layer, the observations associated to $k^{PHY}_n$, $u^{PHY}_n$, and $c^{PHY}_n$ defined above are collected in:

$$y^{PHY}_n = [y^{PHY}_{k,n}, y^{PHY}_{u,n}, y^{PHY}_{c,n}]$$

In addition, $y^{PHY}_{x,n}$ denotes the observations related to the $l^{PHY}_{x,n}$ bits of the payload. The number of values that $u^{PHY}_n$ may take is significantly reduced when exploiting the Duration field contained in the previously received MAC packet (either an RTS or a data packet). Using $B^{PHY}_{n-1}$ for the previous packet at PHY layer and $D^{MAC}_{n-1}$ for the previous packet at MAC layer, one may deduce $l^{PHY}_{x,n}$ from Eq. (12) as:

$$l^{PHY}_{x,n} = \left(D^{MAC}_{n-1} - 3T_{SIFS} - 3T_{OVH} - 2\frac{l_{C-A}}{B^{PHY}_{n-1}}\right)B^{PHY}_{n-1} \qquad \text{Eq. (14)}$$

Then, the duration $L^{PHY}_n$ coded in the Length field 49 of the current PHY packet n may be computed using:

$$L^{PHY}_n = \frac{l^{PHY}_{x,n}}{B^{PHY}_n} \qquad \text{Eq. (15)}$$

In Eq. (14), $l^{PHY}_{x,n}$ is totally determined assuming correct estimation of the header of the previous packet 'n−1' at PHY and MAC layers. Then, according to Eq. (15), $L^{PHY}_n$ may only take two values depending on the value of $B^{PHY}_n$. Integrating these structural correlations in Eq. (8), one obtains the definition of a MAP estimator specific to the PHY layer:

$$\hat{u}^{PHY}_n = \arg\max_{u^{PHY}_n \in \Omega^{PHY}_{u,n}} P(y^{PHY}_{u,n}|u^{PHY}_n)P(y^{PHY}_{c,n}|c^{PHY}_n) \qquad \text{Eq. (16)}$$

where $$c^{PHY}_n = \mathcal{F}^{PHY}([k^{PHY}_n, u^{PHY}_n])$$

Thus, only values of the fields Signal 47 and Length 49, which satisfy Eq. (15) are stored in $\Omega^{PHY}_{u,n}(k, p, R)$ and taken into consideration to correct the header.

The intra-layer and inter-layer redundancy described above can be exploited in an enhanced PHY layer decoder module 32 constructed similarly to the decoder module 10 of FIG. 1. In that embodiment, the control data correction module 6 accesses information about the previously received packet in order to determine values of the Length field 49, which satisfy Eq. (15). For example, the control data correction module 6 computes $l^{PHY}_{x,n}$ through Eq. (14) by reading the parameter $B^{PHY}_{n-1}$ in caching module 5, where it was previously written by processing module 3. Similarly, parameter $D^{MAC}_{n-1}$ may be obtained from the MAC decoder module 33, e.g. through a temporary data storage.

In that embodiment, the control data correction module 6 constructs a set of two candidate values for the PHY header 42 of packet 'n', which correspond to the only two values of the Signal field 47 allowed by the protocol specification, i.e. $0A_{16}$ and $14_{16}$. The resulting CRC values for the field 46 are also computed. Then the control data correction module 6 evaluates Eq. (16) to select the candidate value that best matches the observation, i.e. the received value of the header field 42 and CRC field 46. This allows recovering the correct header value in many cases. Then the processing module 3 of this embodiment uses the recovered value of the Length field 49 to correctly delimit and decapsulate the payload of the PHY packet 'n'.

The above embodiment assumes that the service field 48 is constantly set to $00_{16}$. However, if a particular implementation of the protocol allows several values for the service field 48, then a corresponding PHY layer decoder module can be implemented based on the same principle. In order to construct a set of candidate values for header recovery, all possible values of the service field 48 are then taken into consideration in combination with the two possible values of the Signal field 47.

FIG. 9 illustrates an embodiment of a decoding method for the PHY layer, which may be executed by the PHY layer decoder module 32 at the receiver. Arrows 62 show the exchange of information between layers and between consecutive packets. The header recovery step 66 is performed in accordance with the above.

In addition, $y^{PHY}_{s,n}$ denotes the observations of the known preamble $s^{PHY}$ of $l_s^{PHY}$ bits. As explained above, the receiver synchronization is performed with $s^{PHY}$. In an embodiment, the noise power $\sigma^2$ is estimated from $s^{PHY}$ and $y^{PHY}_{s,n}$. This measure is useful for working with the soft information, as it allows the evaluation of all likelihoods. The noise power estimator is given by:

$$\hat{\sigma}^2 = \frac{1}{l_s^{PHY}} \|y_{s,n}^{PHY} - s^{PHY}\|^2 \qquad \text{Eq. (19)}$$

where $\|\cdot\|$ denotes the Euclidian distance.

Bypassing the header recovery step 66 when the normal CRC check is successful may minimize computational complexity. In an embodiment, the header recovery processing is deactivated when the quality of the soft information provided by the lower layer is too poor, i.e., when the signal power is lower than a pre-defined threshold. In such a case, the packet is discarded.

In FIG. 9, the MAC decoding step 63 may or may not include a MAC header recovery method.

PHY Simulation Results

A transmission system 64 shown on FIG. 4 consisting of a transmitter AP, an AWGN channel 65, and a receiver T1 has been numerically simulated. The AP generates PHY and MAC packets following the formats defined in FIGS. 6 and 7. The MAC payloads consist of a variable amount of randomly generated bytes. The transmitter modulates data in DBPSK for all the simulations. Three types of PHY header recovery methods ore considered in T1. A standard decoder performs hard decisions on the data at channel output. A robust decoder exploits only the intra-layer and inter-layer redundancy through a soft decoding algorithm, neglecting the information provided by the CRC. Finally, a CRC robust decoder combines the intra-layer and inter-layer redundancy together with the information provided by the CRC through the header recovery method presented in the previous section using Eq. (16).

Performance analysis in terms of EHR (Erroneous Header Rate) versus Signal to Noise Ratio is presented in FIG. 10. In FIG. 10, the standard, robust, and CRC-robust PHY decoders are compared. The robust decoders outperform the standard one. An EHR of less than $10^{-5}$ is obtained with the robust decoder for an SNR above 4 dB and for an SNR above 2 dB for CRC-robust decoder. With the standard decoder, an SNR of at least 15 dB is required to get a comparable EHR. At PHY layer, considerable coding gains for a relatively low additional complexity are thus observed.

MAC-Lite Header Recovery

In an embodiment of the transmission system of FIG. 4, the MAC layer is implemented with a modified packet format, in which the CRC field 51 is modified to protect only the header field 52 of the MAC packet. This modified MAC protocol will be referred to as MAC-Lite by analogy to the UDP-Lite protocol described in Request For Comment 3828 by the Internet Engineering Task Force. In this case, since vector $o^{MAC}$ is empty, a MAC-Lite decoder module can implement a header recovery method using a MAP estimator defined as:

$$\hat{u}_n^{MAC} = \arg\max_{u_n^{MAC} \in \Omega_{u,n}^{MAC}} P(y_{u,n}^{MAC} | u_n^{MAC}) P(y_{c,n}^{MAC} | c_n^{MAC}) \qquad \text{Eq. (20)}$$

where $$c_n^{MAC} = \mathcal{F}^{MAC}([k_n^{MAC}, p_n^{MAC}, u_n^{MAC}])$$

Thus at a MAC-Lite layer, a header recovery method can be used with steps similar to the above described PHY layer. To construct the candidate values, the known and predictable fields defined in the MAC layer description are set to their respective single predicted values. In this embodiment, the MAC-lite decoder module uses intralayer redundancy to determine those values.

The PHY packet payload $y^{PHY}_{x,n}$ enters the MAC layer and contains the observations associated to $k^{MAC}_n$, $p^{MAC}_n$, $u^{MAC}_n$, $o^{MAC}_n$ and $c^{MAC}_n$ specified in the MAC layer description. Using the conventions defined in the generic model, one may write:

$$y_n^{MAC} = y_{x,n}^{PHY} = [y_{k,n}^{MAC}, y_{p,n}^{MAC}, y_{u,n}^{MAC}, y_{o,n}^{MAC}, y_{c,n}^{MAC}].$$

The number of possible combinations for $u^{MAC}_n$ may be significantly reduced when exploiting properties of Eqs. (12) and (13). Indeed, the value of Duration $D^{MAC}_n$ is totally determined when $M^{MAC}_n=0$. When $M^{MAC}_n=1$, the value of Duration field 61 depends on the next PHY payload size. The number of combinations is a function of the range of MAC payload size. Considering that the payload contains an entire number of bytes, the possible values of $l_{x,n+1}^{PHY}$ in Eq. (12) are given by:

$$l_{x,n+1}^{PHY} = l_{HDR} + 8i \qquad \text{Eq. (17)}$$

where i=1, 2 . . . 2312.

In Eq. (17), $l_{HDR}$ specifies the known size of the header in a MAC data packet. Then, using Eqs. (12), (13), and (17), $u^{MAC}_n$ is limited to 2313 combinations, which are inserted in the set of candidate values $\Omega^{MAC}_{u,n}$.

Standard, robust, and CRC-robust MAC-Lite decoders are compared in FIG. 11. Three types of MAC-Lite header recovery methods are considered in T1. A standard decoder performs hard decisions on the data provide by the PHY layer. A robust decoder exploits only the intra-layer redundancy through a soft decoding algorithm, neglecting the information provided by the CRC. Finally, a CRC robust decoder combines the intra-layer redundancy together with the information provided by the CRC through the header recovery method based on Eq. (20). EHR is lower than $10^{-5}$ for SNRs larger than 3 dB when exploiting the CRC redundancy whereas the two other methods need at least 14 dB.

The respective robust decoder modules described above at PHY layer and MAC-Lite layer can be used independently one from the other or in combination. In a combined embodiment, both decoder modules 32 and 33 of FIG. 5 execute a corresponding header recovery method, which increases the number of payloads reaching the next protocol layers. In a numerical simulation, the combination of the proposed permeable PHY and MAC-Lite layer mechanisms recovered eventually all PHY and MAC headers from 3 dB SNR onwards.

In the above described embodiments of PHY and MAC layer decoder modules, the allocation of the respective header fields to the categories of the model defined as known vector k, predictable vector p and unknown vector u are purely illustrative and not limitative. Those allocations are based on the assumption that some elements of the communication context are fixed a priori. In other use cases, there may be more or less context information known a priori. As a consequence, in other embodiments, some of the fields presented as known or predictable will be treated as unknown instead. Although the computational complexity of the header recovery process may increase if more fields are treated as unknown, an adequate use of intralayer or interlayer redundancy will allow keeping this complexity to an acceptable level in many instances.

Second Embodiment of the MAP Estimator

In other protocols, the CRC covers not only the control data at layer L but also some or all of the service data, e.g. the payload in a regular 802.11 MAC layer. In the generic model, this situation implies that the vector o is not empty. Embodiments of a MAP estimator suitable for recovering the control data of a PDU, e.g. a MAC packet header in such a case will now be described.

When o is not empty, we assume that the bits of o are i.i.d. and do not depend on the other parameters. The second term of Eq. (6) then becomes $$\Psi(k, p, u, y_o, y_c) = \sum_{o} P(o) P(y_o \mid o) \qquad \text{Eq. (9)}$$
$$P(y_c \mid \mathcal{F}([k, p, u, o]))$$

In Eq. (9), P(o) defines the a priori probability of vector o, $P(y_o|o) \approx N(o, \sigma^2 I_{l_o})$ and $P(y_c|c)) \approx N(c, \sigma^2 I_{l_c})$, where N(.,.) denotes a Gaussian law with the first argument being the mean value and the second argument being the variance.

Evaluating Eq. (9) requires the computation of the sum of probabilities related to the 2**lo combinations of vector o and to their corresponding CRCs. This evaluation has obviously a complexity exponential in lo. In this section, two methods are proposed for reducing the complexity of Eq. (9). The first one involves an exact computation and the second one provides an approximate solution.

Exact Sum Computation

This method involves a trellis construction consisting in grouping combinations of values taken by o resulting to the same value of the CRC. The trellis is composed of a collection of states interconnected by segments. The states are grouped into to lo+1 sets indexed by the parameter j=0, 1 . . . lo representing the depth in the trellis and corresponding to the bits of o. At any depth j, 2lc states exist, i.e. the 2lc values of the CRC. Segments connect states between depth j and j+1, for j=0, 1 . . . lo-1. At depth j, each state indexed by i=0, 1 . . . 2**lc-1 takes a value $S_i(i)$. The index i specifies the numerical value of the CRC $c_i$. Hence, the vector $c_i$ contains the binary representation of i.

The steps for evaluating Eq. (9) are detailed below. The trellis is built starting from depth 0 and going forwards to depth lo.

Step 1—At depth j=0, $S_i(0)=0$ for all i, except for i=u where $S_u(0)=1$. The only possible state at depth 0 is specified by $c_u=F([k, p, u, 0])$, which represents the value of the CRC when vectors k, p, and u are known.

Step 2—For j=1, 2 . . . lo, each state is connected to two previous states depending on the j-th entry of vector o:

$$S_i(j)=P(o_j=0)P(y_{o_j}|o_j=0)S_i(j-1)+P(o_j=1)P(y_{o_j}|o_j=1)S_q(j-1)$$

where i=0, 1 . . . 2**lc-1 and q is the integer represented by $c_q=c_i \oplus \pi(j)$.

Step 3—After lo iterations, one gets for any i=0, 1 . . . 2**lc-1:

$$S_i(l_o) = \sum_{o|\mathcal{F}([k,p,u,o])=c_i} P(o) P(y_o \mid o)$$

Multiplying Si(lo) by $P(y_c|c_i)$, one obtains:

$$L_i = P(y_c \mid c_i) \sum_{o|\mathcal{F}([k,p,u,o])=c_i} P(o) P(y_o \mid o)$$

where $L_i$ depends on all the values of o giving the same CRC $c_i$.

Step 4—Summing up the values of $L_i$, for i=0, 1 . . . 2**lc-1, one gets finally:

$$\sum_{i=0}^{2^{lc}-1} L_i = \Psi(k, p, u, y_o, y_c)$$

Example 1

FIG. 12 represents the trellis, which may be obtained for a systematic binary Hamming (7, 4) code with:

$$\Pi = \begin{bmatrix} 1 & 1 & 0 \\ 1 & 0 & 1 \\ 0 & 1 & 1 \\ 1 & 1 & 1 \end{bmatrix}$$

In the example, it is assumed that [k, p, u]=[1] and that lo=3.

For a given value of k, p, and u, this technique allows a complexity reduction for the evaluation of Eq. (9) from O(2lo) to O(lo2lc). Nevertheless, the initialization at Step 1 depends on the value taken by F ([k, p, u]). For all values of u in Ωu, a new trellis has to be constructed. The global complexity is thus O(|Ωu|lo2**lc), where |Ωu| denotes the cardinal number of Ωu.

In the following, a method evaluating simultaneously Eq. (9) for all the initial states at depth 0 (the 2**lc possible values of the CRC) is proposed. This method consists in constructing the trellis by starting from depth to and going backwards to depth 0. The steps for the sum evaluation are presented below.

Step 1—At depth i=lo, $Si(lo)=P(y_c|c_i)$ for any i=0, 1 . . . 2**lc-1.

Step 2—For j=lo-1 . . . 1, 0, $$S_i(j)=P(o_{j+1}=0)P(y_{o_{j+1}}|o_{j+1}=0)S_i(j+1)+P(o_{j+1}=1)P(y_{o_{j+1}}|o_{j+1}=1)S_q(j+1)$$

for all i, q denoting the numerical value of $c_q=c_i \oplus \pi(j+1)$. At depth j, the state i is thus connected to the states i and q at depth j+1.

Step 3—After lo iterations, for i=u, one gets:

$$S_u(0) = \sum_o P(o)P(y_0 \mid o)P(y_c \mid c_u \oplus \mathcal{F}(0, 0, 0, o))$$
$$= \Psi(k, p, u, y_o, y_c),$$

with $c_u$=F([k, p, u, 0]).

Example 2

Using the same code as in Example 1, one gets the trellis (constructed backwards) represented in FIG. 13. This method allows to compute directly the sum in Eq. (9) for all values taken by u with a complexity O(lo2**lc).

Approximate Sum Computation

Most CRCs are larger than 16 bits. In some instances, the complexity O(lo2**lc) may be too large to allow a real-time implementation of the method presented above. An approximate computation consists in splitting the CRC into $n_b$ blocks of lb=lc/$n_b$ bits. For example a CRC with length lc=32 can be split into $n_b$=4 blocks with length lb=8. In what follows, each of these blocks is assumed to be statistically independent from the others. Using this decomposition, one may write $y_c$ as:

$$y_c = [y_{c_1}, y_{c_2} \ldots y_{c_{n_b}}]$$

Using the independence assumption, the sum in Eq. (9) becomes:

$$\Psi(k, p, u, y_o, y_c) = \prod_{m=1}^{n_b} \Psi_m(k, p, u, y_o, y_{c_m}) \quad \text{Eq. (10)}$$

with $$\Psi_m(k, p, u, y_o, y_{c_m}) = \sum_o P(o)P(y_o \mid o)P(y_{c_m} \mid \mathcal{F}_m([k, p, u, o])) \quad \text{Eq. (11)}$$

where $F_m$ the encoding function associated to the columns (m−1).lb+1 to m.lb of Π, evaluating a partial CRC of lb bits. The evaluation of Eq. (11) is similar to that of ψ described in the previous section. The only difference lies in the size of trellis: 2lb states have to be considered at any depth (instead of 2lc states without splitting the CRC). The total computational complexity for evaluating Eq. (10) is now O($n_b$lo2**(lc/$n_b$)).

The second embodiment of the MAP estimator makes it possible to recover transmission errors in selected portions of the information covered by the error detection code, i.e. fields of interest identified as u, k and p, while disregarding potential errors affecting other portions of the information covered by the error detection code, i.e. secondary fields identified as o. A permeable protocol layer decoder can thus be implemented in which a MAP estimator of this type serves to recover errors in the control data only. An embodiment of this type can be used for a standard 802.11 MAC layer. The decoder module 10 shown on FIG. 1 can be easily adapted to implement this embodiment. The functions of the control data correction module 6 are modified to allow determining the marginal likelihoods of the respective candidate values of the header.

MAC Header Recovery

Combining the properties of a 802.11 MAC layer in Eq. (7), one obtains the following MAC metric:

$$\hat{u}_n^{MAC} = \arg\max_{u_n^{MAC} \in \Omega_{u,n}^{MAC}} P(y_{u,n}^{MAC} \mid u_n^{MAC}) \cdot \quad \text{Eq. (18)}$$
$$\Psi(k_n^{MAC}, p_n^{MAC}, u_n^{MAC}, y_{o,n}^{MAC}, y_{c,n}^{MAC})$$

where the second term represents the marginal likelihoods of the respective candidate values of the header and may be computed with methods presented in the second embodiment of the MAP estimator.

A robust MAC decoder executing a header recovery method based on Eq. (18) has been numerically simulated under conditions similar to the PHY layer simulations. FIG. 14 compares the coding gains obtained by the standard, robust, and CRC-robust MAC decoders. Two payload sizes (50 and 100 bytes) have been considered. Moreover, the Approximate Sum Computation method presented above has been used, dividing the CRC in four blocks of 1 byte each. The shape of the curves is very similar to the results obtained at PHY layer, but with significantly less coding gains. Gains due to MAC CRC information improve with increasing SNR. With payloads of 100 bytes, EHR lower than $10^{-5}$ are achieved for SNRs of 11 dB, 14 dB, and 15 dB when using CRC-robust, robust, and standard MAC decoders respectively. The MAC header recovery processing is more complex than the one done at PHY layer due to the marginalization operation required in Eq. (9). The larger the payload, the more complex the decoding process. A difference between the robust MAC decoder and the CRC-robust MAC decoder lies in the taking into consideration of last term of Eq. (9), i.e. the correlation of CRC values. FIG. 14 allows appreciating the contribution of this feature in the efficiency of the CRC-robust MAC decoder.

FIG. 17 is a representation similar to FIG. 9, which illustrates an embodiment of a decoding method adapted to a 802.11 protocol stack. FIG. 17 combines a step of PHY header recovery 85 based on evaluating Eq. (16), which may be executed by the PHY layer decoder module 32, and a step of MAC header recovery 86 based on evaluating Eq. (18), which may be executed by the MAC layer decoder module 33 at the receiver. With this combined embodiment, a higher number of MAC payloads may be passed to the upper layer, as shown at reference number 87 e.g. in the form of soft decision data.

The above described second embodiment of the MAP estimator can be applied to permeable protocol layer decoders as well as any other application in which a selective recovery of transmission errors is desired.

In an embodiment, the second embodiment of the MAP estimator serves as a basis for an error correction method applied to error resilient video transmission using a scalable video codec. A scalable video codec is defined as a codec capable of producing a bitstream that can be divided into embedded subsets. These subsets can be independently decoded to provide video sequences of increasing quality. Thus, a single compression operation can produce bitstreams with different rates and corresponding reconstructed quality levels. Scalable video codecs are supported by most of the video compression standards such as MPEG-2, MPEG-4 and H.263.

Video data partitioning may be used to facilitate scalability. For example in MPEG-2, the slice layer indicates the maximum number of block transform coefficients contained in the particular bitstream, known as the priority break point. Data partitioning is a frequency-domain technique that breaks the block of 64 quantized transform coefficients into two bitstreams. The first, higher priority bitstream, e.g. base layer, contains the more critical lower frequency coefficients and side information, e.g. zero-frequency values and motion vectors. The second, lower priority bitstream, e.g. enhancement layers, carries higher frequency video data.

In an embodiment illustrated on FIG. 15, a subset of the original bitstream can be transmitted as primary data to provide a base layer quality with one or more extra layers transmitted as secondary data to provide enhancement layers. Thus, the error correction method allows applying unequal error protection, e.g. stronger error protection to the base layer than to the enhancement layers while transporting multiple layers in the same packet. As a result, the base layer can be successfully decoded with higher probability even during adverse transmission channel conditions.

FIG. 15 is a diagrammatic representation of a transmission system 80 for transmitting video, i.e. a sequence of pictures. The system 80 comprises a transmitter device 70, which transmits video data to a receiver device 71 on a communication channel 72, e.g. a wireless channel. The video is encoded with a scalable video codec. In the transmitter device 70, a coder module 73 encodes the sequence of pictures with a scalable video codec, e.g MPEG-4, to produce a first bistream corresponding to a base layer and at least one second bitstream corresponding to an enhancement layer and places successive segments of the resulting bitstreams into packets 74 to be transmitted. Thus the coder module 73 produces a sequence of data packets 74. In the illustrated embodiment, a packet 74 comprises a primary field 75 for data belonging to the first bitstream, a secondary field 76 for data belonging to the second bitstream and an error detection field 77 for an error detection code (e.g. CRC) associated to the primary and the secondary fields. The sequence of the data packets 74 is transmitted through the communication channel 72 using any suitable transmission protocol or protocol stack and any suitable encapsulation techniques. Hence in the transmitter device 70, the coder module 73 may be connected to further coder modules corresponding to lower protocol layers, which FIG. 5 does not show.

In the receiver device 70, a decoder module 90 receives the successive packets 74, e.g. from further decoder modules corresponding to lower protocol layers, not shown. The decoder module 90 checks the CRC received in the field 77 against the corresponding data contained in the packet. When the CRC check is unsuccessful, the decoder module 90 performs a selective error recovery method to recover transmission errors affecting the primary field 75, i.e. the base layer.

FIG. 16 is a diagrammatic representation of an embodiment of the decoder module 90. The decoder module 90 comprises an input module 91 for receiving the data packets 74 and an error detection code checking module 92 for checking the error detection code of the received packet. If the check is successful, the module 92 removes the field 77 and passes the video data of the fields 75 and 76 to an output module 93. The output module 93 outputs the video data to a suitable video decoder, e.g MPEG-4, which decodes the first and second bitstreams to reconstruct the sequence of pictures.

If the check is unsuccessful, the error detection code checking module 92 passes the packet 74 to a selective error correction module 94 which operates to find the most likely correct value of the data belonging to the first bitstream, i.e. to recover the primary field 75. The selective error correction module 94 determines a finite net of candidate values for the primary field 75, e.g. an exhaustive list of $2**L$ binary values where L is the length of the field 75 or a more limited set if a priori known information allows excluding some of those binary values. For each candidate values of the set, the selective error correction module 94 determines a marginal likelihood of the candidate value as a function of the data received in the fields 76 and 77 of the received packet 74, e.g. by evaluating Eq. (9) or Eq. 10). The selective error correction module 94 also determines a correlation, e.g. Euclidian distance, between the data received in the primary field 75 of the received packet 74 and the candidate value. Then it uses the respective marginal likelihoods and correlation values to select a candidate value for the primary field, which best matches the observation. Then the selective error correction module 94 passes the corrected value of the primary field 75 to the output module 93, so that at least the base layer con be decoded. The received value of the secondary field 76 may be passed to the output module 93 as well, although transition errors affecting it, if any, will not be corrected by the above described process.

In a modified embodiment of the transmission system 80, the packet 74 further comprises a header field 78, which is also covered by the error detection code in field 77. For instance such a packet 74 can be used at an UDP or UDP-Lite protocol layer. Then the selective error correction module 94 can be adapted to recover transmission errors found the header field 78 as well as the primary field 75. Assuming that those fields are independent, candidate values to be considered in that case include any combination of a candidate value for the control data of the header field 78 with a candidate value for the video data of the primary field 75.

In further embodiments, the packet 74 may comprise multiple primary fields and or multiple secondary fields. For the decoder module 90 to handle the primary and secondary data as such, a corresponding map of the packet format must be available to the decoder module 90. This can be made available to the decoder module in any suitable manner, e.g. fixedly configured or communicated through another channel. Preferably, the primary field or fields are located closer to the packet head than the secondary field or fields, but this is not mandatory.

The described methods and devices for recovering transmission errors can be applied to other transmission protocols layers than those mentioned above, e.g. DVB, Wimax as well as non-standard protocol layers. The methods and devices for recovering for recovering transmission errors can be applied at a single protocol layer or at several protocol layers of a protocol stack.

The described methods and devices for recovering transmission errors can be applied to the transmission of any type of data. Applications to the transmission of compressed multimedia contents are contemplated in particular, since the payload of a PDU at any underlying layer may comprise a large amount of application data, i.e. multimedia contents information. Applications to the transmission of information over wireless channels ore contemplated in particular, since those are more prone to transmission errors. Applications to broadcast transmissions, e.g. satellite television or to transmissions with strong delay constraints, e.g. visiophony are contemplated in particular, since those make it difficult to rely on retransmissions to recover erroneous packets.

The described methods and devices for recovering transmission errors can be applied to permeable protocol layer decoders, especially for one or more lower transmission protocol layers of a protocol stack in which joint source-channel decoding techniques allow many errors to be corrected at the application layer. By increasing the amount of packets reaching the application layer, e.g. in the form of soft information, such permeable protocol layer decoders allow improving the performance of joint source-channel decoding at the application layer.

The functions of the various elements shown in the Figs., including any functional blocks referred to as "modules", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The invention is not limited to the described embodiments. The appended claims are to be construed as embodying all modification and alternative constructions that may be occurred to one skilled in the art, which fairly fall within the basic teaching here, set forth.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several <<means>>.

In the claims, any reference signs placed between parentheses shall not be construed as limiting the scope of the claims.

The invention claimed is:

1. A method for recovering transmission errors comprising:
   receiving, at a receiver, a data comprising an error detection code associated to data contained in the packet, wherein the data associated to the error detection code comprises primary data and secondary data;
   checking, by the receiver, the error detection code of the received packet to detect an erroneous state of the associated data, when the erroneous state is detected;
   determining, by the receiver, a finite set of candidate values for the primary data and, for each candidate values of the set;
   determining, by the receiver, a marginal likelihood of the candidate value over the secondary data as a function of the error detection code of the received packet, determining a first correlation between the primary data of the received packet and the candidate value; and
   selecting, by the receiver, a corrected value for the primary data among the set of candidate values as a function of said marginal likelihoods and said first correlations.

2. A method in accordance with claim 1, wherein the step of determining a marginal likelihood of the candidate value comprises:
   determining a finite set of potential values for the secondary data,
   sorting the potential values of the secondary data into subsets associated to respective error detection code values, wherein all the potential values of the secondary data within a subset are selected to yield the associated error detection code value when combined with the candidate value of the primary data,
   for each subset, determining a marginal likelihood of the secondary data belonging to the subset as a function of the secondary data of the received packet and the error detection code of the received packet,
   determining said marginal likelihood of the candidate value by cumulating said marginal likelihoods for all said subsets.

3. A method in accordance with claim 2, wherein the step of determining the marginal likelihood of the secondary data belonging to a subset comprises:
   determining a second correlation between the error detection code value associated to the subset and the error detection code of the received packet;
   determining third correlations between the potential values of the secondary data within the subset and the secondary data of the received packet; and
   determining the marginal likelihood of the secondary data belonging to the subset as a function of said second correlation and said third correlations.

4. A method in accordance with claim 1, wherein the step of determining a marginal likelihood of the candidate value comprises:
   splitting the error detection code of the received packet into a plurality of blocks, for each block of the error detection code of the received packet, determining a partial marginal likelihood of the candidate value as a function of said block, and determining said marginal likelihood of the candidate value as a function of the partial marginal likelihood associated to all blocks of the error detection code.

5. A method in accordance with claim 4, wherein the step of determining a partial marginal likelihood of the candidate value comprises:
   determining a finite set of potential values for the secondary data,
   sorting the potential values of the secondary data into subsets associated to respective values of the block of the error detection code, wherein all the potential values of the secondary data within a subset are selected to yield the associated block value when combined with the candidate value of the primary data,
   for each subset, determining a partial marginal likelihood of the secondary data belonging to the subset as a function of the secondary data of the received packet and the block of the error detection code of the received packet,
   determining said partial marginal likelihood of the candidate value by cumulating said partial marginal likelihoods for all said subsets.

6. A method in accordance with claim 5, wherein the step of determining the partial marginal likelihood of the secondary data belonging to a subset comprises:

determining a second correlation between the block value associated to the subset and the block of the error detection code of the received packet, and determining third correlations between the potential values of the secondary data within the subset and the secondary data of the received packet, determining the partial marginal likelihood of the secondary data belonging to the subset as a function of said second correlation and said third correlations.

7. A method in accordance with claim 2, wherein the step of sorting the potential values of the secondary data into subsets associated to respective error detection code values or respective block values comprises constructing a trellis representation of the potential values of the secondary data.

8. A method in accordance with claim 7, wherein the trellis representation is constructed from a lower depth value to a higher depth value, wherein the depth of the trellis represents a number of bits of secondary data already determined.

9. A method in accordance with claim 7, wherein the trellis representation is constructed from a higher depth value to a lower depth value, wherein the depth of the trellis represents a number of bits of secondary data already determined.

10. A method in accordance with claim 2, wherein the finite set of potential values for the secondary data comprises all possible combinations of binary values for each and every bit of data of a field of the packet reserved for secondary data.

11. A method in accordance with claim 1, wherein the packet comprises a protocol data unit, wherein the primary data includes control data of the protocol data unit and the secondary data includes service data of the protocol data unit.

12. A method in accordance with claim 11, further comprising the step of processing the service data of the received protocol data unit as a function of the corrected value of the control data.

13. A method in accordance with claim 1, wherein the packet comprises video data coded with a scalable video codec, wherein the primary data includes video data corresponding to a base layer and the secondary data includes video data corresponding to an enhancement layer.

14. A device for recovering transmission errors comprising:

an input means for receiving a data packet comprising an error detection code associated to data contained in the packet, wherein the data associated to the error detection code comprises primary data and secondary data, an error detection code checking means for checking the error detection code of the received packet to detect an erroneous state of the associated data, a primary data correction means operable to determine a finite set of candidate values for the primary data and, for each candidate values of the set, to determine a marginal likelihood of the candidate value over the secondary data as a function of the error detection code of the received packet, to determine a first correlation between the primary data of the received packet and the candidate value, and to select a corrected value for the primary data among the set of candidate values as a function of said marginal likelihoods and said first correlations.

15. A permeable protocol layer decoder comprising the device in accordance with claim 14 and a processing module, wherein the packet comprises a protocol data unit, wherein the primary data includes control data of the protocol data unit and the secondary data includes service data of the protocol data unit, wherein the processing module is operable to process said service data as a function of said control data.

\* \* \* \* \*